United States Patent [19]

May

[11] Patent Number: 4,957,348
[45] Date of Patent: Sep. 18, 1990

[54] OPTICAL TRANSCEIVER WITH MULTIPLE COMMUNICATION MODES

[75] Inventor: Gregory J. May, Corvallis, Oreg.

[73] Assignee: Hewlett-Packard Company, Palo Alto, Calif.

[21] Appl. No.: 327,229

[22] Filed: Mar. 21, 1989

[51] Int. Cl.⁵ ............................................. G02B 27/00
[52] U.S. Cl. ..................... 350/321; 250/555; 235/462; 350/255; 455/606
[58] Field of Search ............... 350/321, 423, 241, 255, 350/254, 315; 235/462, 440, 454; 455/73, 78, 88, 89, 606; 250/555, 556, 557, 237 G

[56] References Cited

U.S. PATENT DOCUMENTS

| | | | |
|---|---|---|---|
| 3,790,756 | 2/1974 | Graves et al. | 250/555 |
| 4,282,425 | 8/1981 | Chadima, Jr. et al. | 250/555 |
| 4,694,182 | 9/1987 | Howard | 235/462 |
| 4,743,744 | 5/1988 | Nakase et al. | 235/462 |
| 4,748,317 | 5/1988 | Satoh | 235/462 |
| 4,792,666 | 12/1988 | Cherry et al. | 235/462 |

*Primary Examiner*—Bruce Y. Arnold
*Assistant Examiner*—Loha Ben

[57] ABSTRACT

Apparatus that enables an optical transceiver (14) to communicate data as a bar code reader or by way of modulated light. A lens assembly (22) adjusts the focal distance of the optical transceiver (14) to enable it to communicate in these multiple modes. A control circuit (16) and microprocessor (12) are coupled to the optical transceiver (14) and are responsive to the focal distance setting of the lens assembly (22) for selecting the appropriate communication mode. The apparatus is of particular value in low-power, portable environments, such as in calculators or other portable computing devices.

12 Claims, 3 Drawing Sheets

OPTICAL TRANSCEIVER WITH MULTIPLE COMMUNICATION MODES

BACKGROUND OF THE INVENTION

This invention relates to optical transceivers for communicating data and, more particularly, to an optical transceiver which is able to read bar codes as well as communicate by way of modulated light.

Computing devices such as calculators and computers conventionally send and receive data to other devices through cables that physically connect to I/O ports on the connected devices. Physical wires, however, may cause electromagnetic radiated noise and provide a path for destructive ESD (electrostatic discharge).

Communicating data optically is a technique now being explored. IR (infrared) transmitters are currently being used to transmit data by way of modulated light from a calculator such as a Hewlett-Packard 28S to a printer equipped with an IR receiver. Bar code readers are another means for reading data into a computing device.

Both modulated light and bar code reading communication modes are desirable because of the variety of data that may be transmitted and received. Until now, however, it has been impractical to provide these multiple communication modes in calculators and other low power, inexpensive computing devices because of size, cost, and power restraints.

SUMMARY OF THE INVENTION

An object of the invention, therefore, is to provide an improved apparatus for communicating data in a plurality of communication modes.

Another object of the invention is to provide such apparatus that is capable of reading bar codes in one mode and communicating data by way of modulated light in another mode.

Yet another object of the invention is to provide such apparatus that is low cost, compact, and easily implemented in a hand-held calculator or other portable computing device.

In accordance with these objects, such apparatus comprises an optical transceiver, focusing means for adjusting the focal distance of the transceiver, and control means for selecting a communication mode of the transceiver corresponding to the focal distance adjusted for by the focusing means. In the illustrated embodiment, the control means is responsive to the focusing means as the focusing means adjusts the focal distance. For example, if bar codes are to be read, the focusing means adjusts the focal distance of the transceiver to the proper distance, i.e. 2-4 mm. The control means responds to the focusing means by switching the communication mode of the transceiver to bar code reading. If data is to be communicated over a greater distance, the focusing means adjusts to the greater distance and the control means responds by switching the communication mode to IR communication by way of modulated light.

In the illustrated embodiment, the focusing means comprises a lens assembly of which several embodiments are illustrated. The control means comprises a control circuit and microprocessor. The optical transceiver comprises an IR transmitter-receiver. It will be readily appreciated by those skilled in the art that functionally equivalent structural means may be used in place of the illustrated embodiments, which are but a few examples of the invention.

The foregoing and other objects, features, and advantages of the invention will become more apparent from the following detailed description of several preferred embodiments which proceeds with reference to the accompanying drawings.

DETAILED DESCRIPTION

Figure 1:
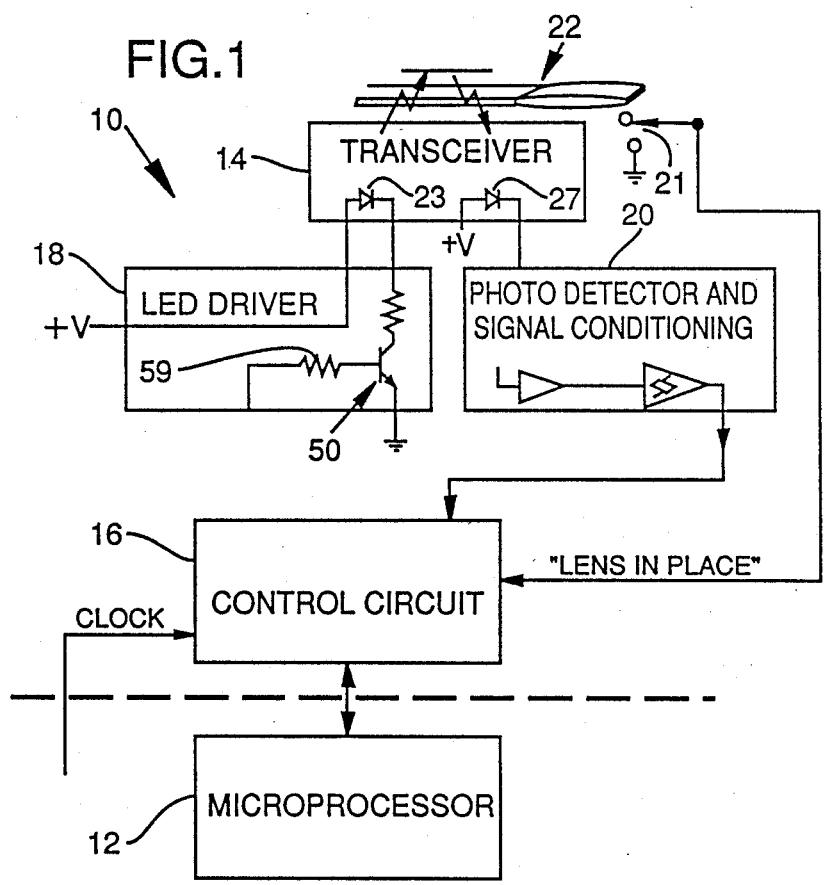
FIG. 1 is a block diagram of an apparatus according to the invention.

FIG. 1 is a block diagram of an apparatus 10 according to the invention for communicating data in a plurality of communication modes. The apparatus 10 is shown coupled to processing means such as a microprocessor 12 symbolically shown within a portable computing or calculator device. The interconnections of the microprocessor 12 to other elements, such as to be described in the apparatus 10, is conventional and should be well understood in the art from the functional description given hereafter. The apparatus 10, of course, is not limited to such devices but may be utilized whenever it is desirable to communicate data including program instructions and other information in multiple modes with minimum power and cost.

As shown in the figure, apparatus 10 comprises an optical transceiver 14 coupled to a control circuit 16 through a conventional LED (light emitting diode) driver circuit 18 and a receiver and signal conditioning circuit 20. Circuit 20 may be one of any number of such circuits such as, for example, disclosed in co-pending U.S. application Ser. No. 07/326,140, filed Mar. 20, 1989 by Preston D. Brown et al., hereby incorporated by reference. Focusing means such as a lens assembly 22 is mounted adjacent to the transceiver 14 for adjusting the transceiver's focal distance, defined as the distance at which light rays emitted from or received by the transceiver are focused. As will be described, the assembly 22 is constructed of appropriately shaped lenses to permit focus of the light rays at a first distance such as 2-4 mm and at greater, second distances such as at infinity. These focal distance settings correspond to the communication modes of the transceiver 14. In a bar code reading mode, the assembly 22 adjusts the transceiver's focal distance to enable the transceiver to read bar codes. In a modulated light communication mode, the assembly 22 adjusts the focal distance to enable the transceiver 14 to communicate by way of modulated light.

From its location adjacent the transceiver 14, the lens assembly 22 is coupled to control means such as the control circuit 16 and microprocessor 12 through a switch 21. Such means are responsive to the focal distance setting of the assembly 22 for selecting the communication mode of the transceiver 14. At a first focal distance setting, for example, the microprocessor 12 selects the bar code reading mode and implements it through control circuit 16. At a second focal setting such as infinity, the microprocessor 12 selects the modulated light communication mode, wherein a modulated infrared light beam is transmitted or received by the transceiver 14, and also implements the mode through control circuit 16. The convex and concave lens relationships required to adjust the focal distance are well known in the art and are amply described in the optics literature such as in Cox, *Photographic Optics* (13th ed. 1966), which is hereby incorporated by reference.

Figure 2A:
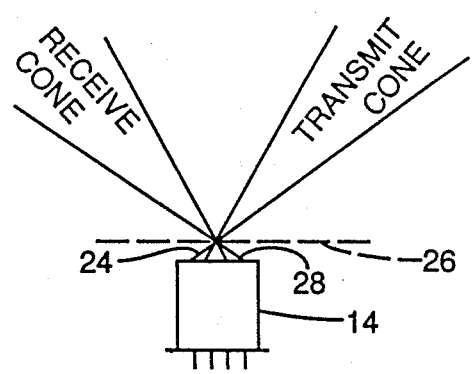
FIG. 2A is a side view of an optical transceiver for the reading of bar codes in a first communication mode.
Figure 2B:
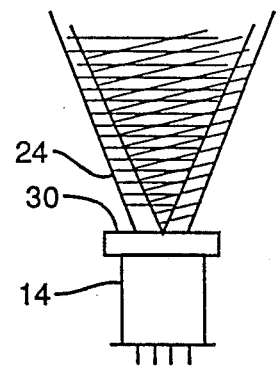
FIG. 2B is a side view of the optical transceiver for communication by way of modulated light in a second communication mode.

FIGS. 2A and 2B illustrate how the lens assembly 22 adjusts the focal distance of the transceiver 14. In FIG. 2A, a conventional optical transceiver such as a HBCS-1100 is shown, designated as a "high resolution optical reflective sensor" in the Hewlett-Packard Optoelectronics Designer's Catalog. The HBCS-1100, as provided, is designed for reading bar codes. An LED 23 within the transceiver 14 transmits an infrared beam 24 that is focused at a first focal distance 26 approximately 2-4 mm from the transceiver 14. Bar codes to be read are held within this focal range. A portion of the beam 24 is reflected back from the bar code to a photodetector 27 within the transceiver 14 as a received beam 28. The bar code is interpreted as the change in the intensity of the received beam 28 as the transmitted beam 24 traverses the code. In FIG. 2B, a lens 30 within the lens assembly 22 is placed in the path of the beam 24 to refocus it at a second focal distance, such as infinity. Lens 30 also acts to focus a received beam that originates at infinity onto the photodetector 27 within transceiver 14. The second focal distance could, of course, be any desired distance from the transceiver 14 such as within the range of 1 to 2 meters if energy dissipation in the transmitted beam may be of concern.

Figure 3A:
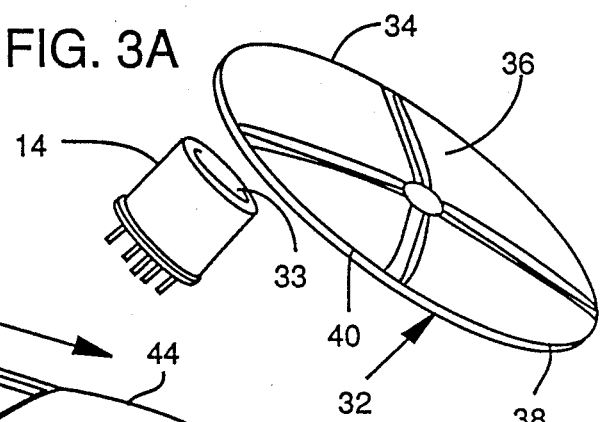
FIG. 3A is a perspective view of a first embodiment of a lens assembly for adjusting the focal distance of the transceiver.

Many embodiments of the lens assembly 22 are possible, with several illustrated herein as examples. In FIG. 3A, transceiver 14 has a fixed lens for focusing beam 24 at the bar code focal distance 26. Lens assembly 22 may then include a rotatable wheel 32 having a plurality of lenses for placing each lens in an optical axis of the fixed lens 33 to adjust the focal distance. A lens 34, for example, may refocus the transceiver 14 at a focal distance of approximately one meter. A second lens 36 may refocus the transceiver at infinity. A third lens 38 may be neutral so that the transceiver 14 remains focused for bar code reading. A fourth lens 40 may be colored to filter out interference from sunlight or overhead lighting.

Figure 3B:
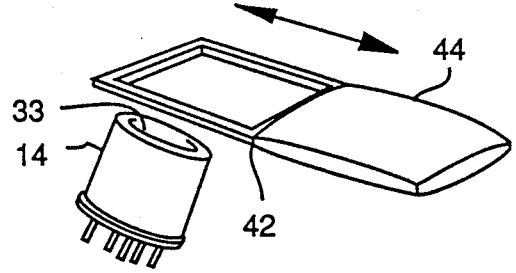
FIG. 3B is a perspective view of a second embodiment of the lens assembly.

FIG. 3B illustrates a lens assembly 22 comprising a slide mechanism 42 for placing an additional lens 44 in front of the fixed lens 33 to adjust the focal distance. With the lens 44 retracted, the transceiver 14 is focused for bar code reading. With the lens 44 slid in place over the transceiver, transceiver 14 is refocused at a greater focal distance for IR or other light wave communication.

Figure 3C:
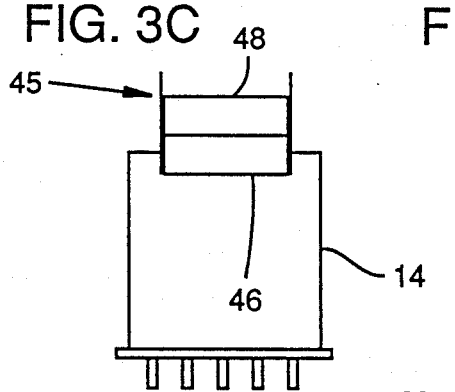
FIG. 3C is a side view of a third embodiment of the lens assembly adjusted for the reading of bar codes.
Figure 3D:
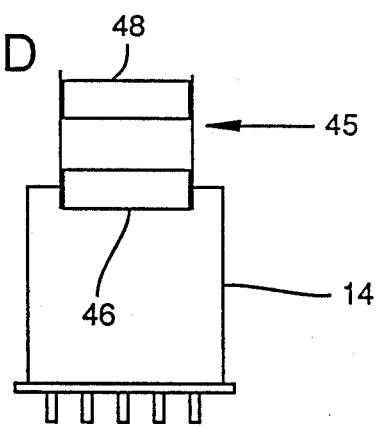
FIG. 3D is a side view of the third embodiment of the lens assembly adjusted for communication of data by way of modulated light.

FIGS. 3C and 3D show a lens assembly 22 wherein transceiver 14 focuses through two lenses placed in the front thereof in a cylinder 45, much like a lens assembly of a camera. In FIG. 3C, the distance between lenses 46 and 48 is such that transceiver 14 is focused at a first focal distance for bar code reading. In FIG. 3D, the distance between lenses 46 and 48 is adjusted so that transceiver 14 is focused at a second focal distance for communicating by way of modulated light.

Figure 3E:
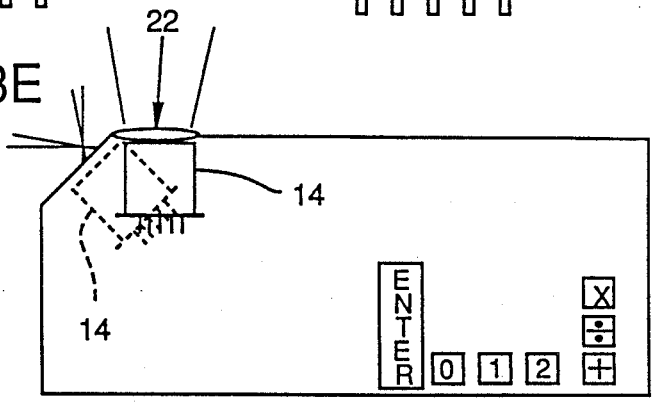
FIG. 3E is a top view of a fourth embodiment of the lens assembly.

Equivalent techniques for refocusing the transceiver are, of course, possible, including positioning the lens assembly relative to the transceiver by moving the transceiver rather than the lens, as illustrated in dashed lines in FIG. 3E.

In whatever embodiment of lens assembly 22 utilized, the assembly is adapted to signal the control circuit 16 as to the focal distance setting. A simple technique is for movement of the lens assembly to actuate switch 21. When the lens assembly focuses the transceiver at the second focal distance, the switch 21 connects to a high logic signal to generate a "lens-in-place" signal. As will be described, microprocessor 12 responds to the "lens-in-place" signal to switch the communication mode of the transceiver 14 from bar code reading to modulated light communication. When lens assembly focuses the transceiver of the first focal distance, the switch connects to ground and the "lens-in-place" signal is low. The microprocessor responds to the low signal by switching to the bar code reading mode.

Referring again to FIG. 1, the control circuit 16, driver circuit 18, and receiver circuit 20 enable the microprocessor 12 to operate the optical transceiver in either communication mode. In the bar code reading mode, control circuit 16 applies a drive voltage to transistor 50 within circuit 18. LED 23 is coupled to the collector of the transistor and is also connected to a voltage source V+. When the drive voltage is applied, transistor 50 conducts and LED 23 is lighted. LED 23 may be continuously lighted in this mode or to conserve power may be strobed by applying the drive voltage periodically. The strobed LED samples the bar code using a sampling technique known in the art such as disclosed in U.S. Pat. No. 4,761,544, which is hereby incorporated by reference. The photodetector 27 is connected to receiver and conditioning circuit 20, which amplifies and filters the received signal in conventional fashion to remove interference from ambient light. The received signal is then transmitted by way of control circuit 16 to microprocessor 12 which interprets the signal data as bar code data in this mode. In the modulated light communication mode, control circuit 16 modulates the bias voltage applied to transistor 50 to transmit data via LED 23. The received signal detected by photodetector 27 and conditioned by receiver circuit 20 is interpreted by the microprocessor 12 as received by way of modulated light data.

Figure 4A:
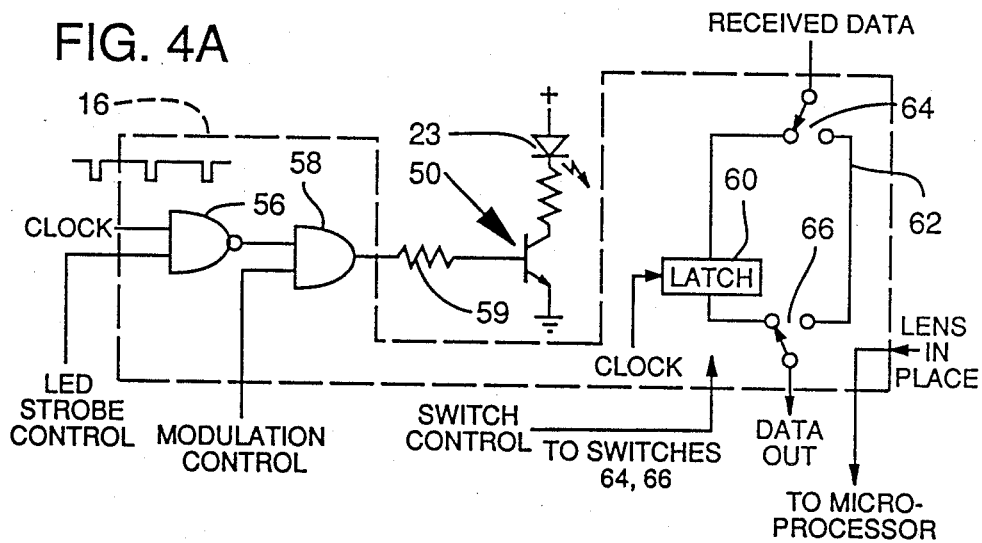
FIG. 4A is a schematic view of the control circuit in FIG. 1.

FIG. 4A illustrates one embodiment of control circuit 16. The circuit 16 includes means for enabling the transceiver 14 to read bar codes in a first communication mode and means for enabling the transceiver to communicate by way of modulated light in a second communication mode. Circuit 16 receives a clock signal derived from a conventional system clock and also receives an LED strobe control signal, a modulation control signal, and a switch control signal from microprocessor 12. The clock signal and LED strobe control signal are applied to a NAND gate 56 within circuit 16. The output of gate 56 and the modulated control signal are applied to an AND gate 58. The output of AND gate 58 is the drive voltage applied to transistor 50 through a current limiting resistor 59. If the LED 23 is to be on continuously in the bar code reading mode, the LED strobe control signal is held low so that the strobe is off. The output of NAND gate 56 is then continuously high. The modulation control signal is also held high so that the output of gate 58 is also continuously high. If the LED 23 is to be strobed in the bar code reading mode to conserve power, the LED strobe signal is held high and the clock strobes the LED on the clock signal's negative transition. The short duty cycle of the clock signal limits the time that the LED is lighted, but the clock signal is of sufficient frequency and duration to sample the bar code accurately. In this mode, the modulation control signal is also held high so that the clock signal controls the drive voltage at the output of AND gate 58, which lights the LED.

Figure 4B:
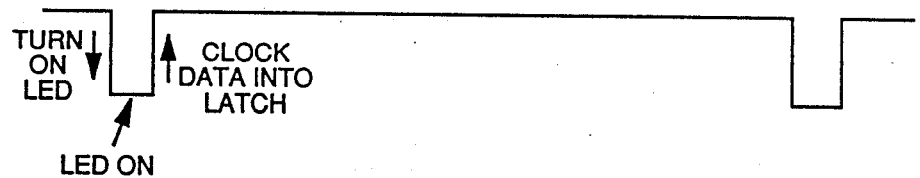
FIG. 4B is a timing diagram for the apparatus.

For interpreting received data, the circuit 16 contains a latch 60 connected in parallel with a path 62. Digitally controlled SPDT (single pole, double throw) switch 64 at an input node couples the latch 60 and path 62 to circuit 20. SPDT switch 66 at an output node couples the latch 60 and path 62 to a data path that connects to a serial port of microprocessor 12. In the bar code reading mode, a high switch control signal applied to switches 64 and 66 causes the switches to connect the latch 60 between circuit 20 and the mircoprocessor. As shown in the timing diagram of FIG. 4B, the bar code data is then latched on the positive transition of the clock signal, where it can be read by the microprocessor 12 at the appropriate time during the remainder of the clock cycle.

In the modulated light communication mode, the microprocessor holds the LED strobe control signal low to cause NAND gate 56 to generate a high output regardless of the clock signal. The modulation control signal, applied to AND gate 58, then controls the drive voltage at the output of AND gate 58. This control signal is modulated by microprocessor 12 to transmit data in serial fashion according to any number of protocols known in the art such as the Kermit protocol described in da Cruz, *Kermit, A File Transfer Protocol* (1987), which is hereby incorporated by reference. The switch control signal changes to a low state to cause the switches 64, 66 to connect the path 62 between circuit 20 and the microprocessor 12, directing the received data around latch 60. The received data is thus routed directly to the serial port of microprocessor 12. The latch 60 is disconnected so that data appearing at its output does not interfere with this received data.

The "lens-in-place" signal from lens assembly 22 is passed directly through circuit 16 to the microprocessor 12 which selects the communication mode based on the signal's logic value.

Microprocessor 12 is programmed in a conventional manner as known in the art to interpret data in response to the "lens-in-place" signal from the lens assembly 22. With the lens assembly 22 set to focus the transceiver 14 at infinity, for example, the "lens-in-place" signal is high and microprocessor 12 selects and implements the modulated light communication mode by transmitting and receiving data in that fashion via a predetermined protocol such as described. With the lens assembly 22 set to focus the transceiver 14 at 2-4 mm, the microprocessor 12 selects and implements the bar code reading mode. A light or other indicator may be provided separately or on the display screen of the calculator or computer system to indicate the selected communication mode.

It should be understood that control circuit 16 as described is but one of a number of functionally equivalent structural means for enabling the microprocessor 12 to communicate with the transceiver 14. It should also be understood that the microprocessor 12 may be adapted to control the lens assembly 22 in response to a signal from the user or that both the microprocessor and lens assembly could be constructed to respond to user control.

Having illustrated and described the principles of the invention in several preferred embodiments, it should be apparent to those skilled in the art that the invention can be modified in arrangement and detail without departing from such principles. I claim all modifications coming within the spirit and scope of the following claims.

I claim:

1. Apparatus for communicating data in a plurality of communication modes, comprising:
    an optical transceiver;
    focusing means for adjusting a focal distance of the optical transceiver; and
    control means for selecting a communication mode of the optical transceiver corresponding to the focal distance adjusted for by the focusing means.

2. The apparatus of claim 1 wherein the control means is responsive to the focusing means in selecting the communication mode.

3. The apparatus of claim 1 wherein the focusing means comprises means for adjusting the focal distance to a first distance for enabling the optical transceiver to read bar codes and to a second distance for enabling the optical transceiver to communicate by way of modulated light.

4. The apparatus of claim 1 wherein the focusing means comprises means for placing each of a plurality of lenses in the path of the optical transceiver to adjust the focal distance.

5. The apparatus of claim 1 wherein the optical transceiver includes a fixed lens and the focusing means comprises means for placing an additional lens in an optical axis of the fixed lens to adjust the focal distance.

6. The apparatus of claim 1 wherein the focusing means comprises means for adjusting the distance between two lenses placed in an optical axis of the optical transceiver to adjust the focal distance.

7. The apparatus of claim 1 wherein the control means comprises means responsive to a focal distance setting of the focusing means for switching the communication mode of the optical transceiver between bar code reading and communication with modulated light.

8. The apparatus of claim 1 wherein the control means comprises processing means for implementing the selected communication mode and a control circuit for enabling the processing means to communicate with the transceiver.

9. Apparatus for communicating data in a plurality of communication modes, comprising:
    an optical transceiver;
    means for enabling the optical transceiver to read bar codes in a first communication mode and to communicate by way of modulated light in a second communication mode;
    a lens assembly including a focusing lens mounted for positioning relative to the optical transceiver for adjusting the focal distance of the optical transceiver; and means responsive to relative positions of the focusing lens and the optical transceiver for switching between the first and second communication modes of the optical transceiver.

10. The apparatus of claim 9 wherein the enabling means comprises a control circuit and the responsive means comprises processing means for communicating with the transceiver through the control circuit.

11. The apparatus of claim 9 wherein said relative positions are toward and away from the optical transceiver and the apparatus includes means for moving the focusing lens into one position to enable the optical transceiver to read the bar codes and into a second position to enable the optical transceiver to communicate with modulated light.

12. An apparatus, comprising:

a computing device;

an optical transceiver mounted to the computing device;

focusing means mounted to the computing device for adjusting the focal distance of the optical transceiver;

processing means arranged within the computing device for implementing a plurality of communication modes of the optical transceiver, said processing means selecting a communication mode corresponding to the focal distance adjusted for by the focusing means; and control circuit means arranged within the computing device to be coupled to the optical transceiver and the processing means for transmitting data therebetween, said control circuit means enabling the optical transceiver in a first communication mode to read bar codes and transmit the read bar code data to said processing means and enabling the optical transceiver in a second communication mode to communicate data with modulated light and transmit the data to and receive the data from the processing means.

* * * * *